Jan. 23, 1968  R. BECKER  3,364,686
PROCESS AND INSTALLATION FOR THE REMOVAL OF EASILY
CONDENSABLE COMPONENTS FROM GAS MIXTURES
Filed Aug. 14, 1964  2 Sheets-Sheet 2

Rudolf Becker
INVENTOR.

BY Karl G. Ross
AGENT

United States Patent Office 3,364,686
Patented Jan. 23, 1968

3,364,686
PROCESS AND INSTALLATION FOR THE REMOVAL OF EASILY CONDENSABLE COMPONENTS FROM GAS MIXTURES
Rudolf Becker, Munich-Solln, Germany, assignor to Linde Aktiengesellschaft, a corporation of Germany
Filed Aug. 14, 1964, Ser. No. 389,612
Claims priority, application Germany, Aug. 17, 1963, G 38,488
9 Claims. (Cl. 62—14)

ABSTRACT OF THE DISCLOSURE

Carbon dioxide condensable components are removed from a warm gas mixture in at least two interchangeable heat exchangers each having a serpentine tube therethru, by cooling the warm gas mixture in the serpentine tube of one exchanger to condense the components therein by heat exchange with a cold gas passing through a packed section of this heat exchanger, deactivating the exchanger and subjecting the serpentine tube to a reduced pressure of 0.05 to 0.5 atmosphere absolute to volatilize the condensed components in the serpentine tube while a scavenging gas flushes the serpentine tube.

---

Figure 1:
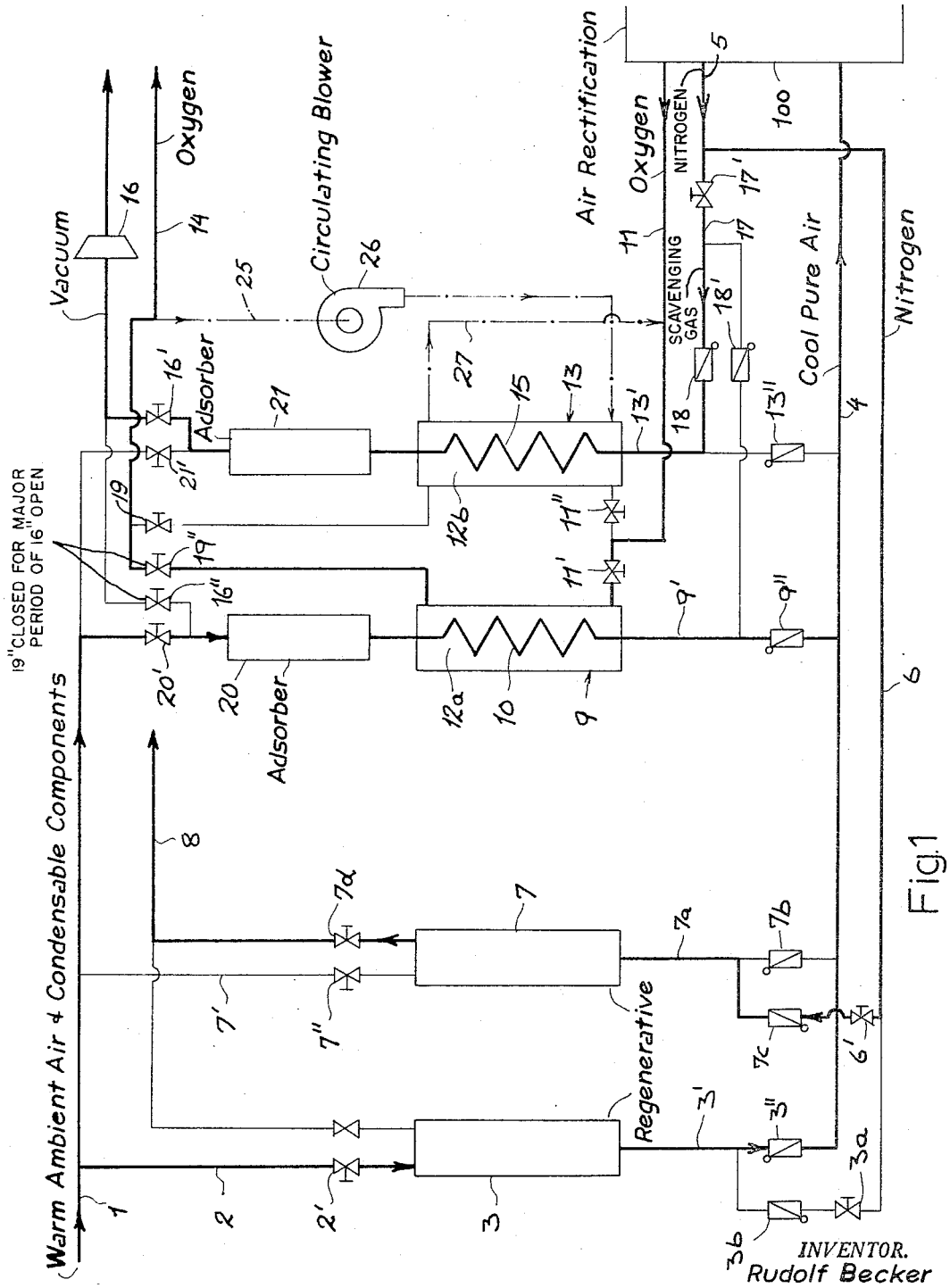

The present invention relates to a process for the removal of easily condensable components from gases by cooling them to temperatures below the dewpoint of the condensable components, thereby precipitating them from the gas in the form of liquids or solids; more particularly, the present invention is drawn to a process and installation of this character using periodically reversible heat exchangers, i.e. heat exchangers whose functions in the treatment of the gas are periodically switched or interchanged.

For the purposes of the present invention, gases containing easily condensable components (e.g. water vapor, carbon dioxide, ethylene, sulfur dioxide and hydrogen sulfide) will be referred to as crude or raw gases, it being understood that such gases are generally relatively warm and can release the easily condensable components by a lowering of the gas temperature in a heat exchanger to a temperature below the dewpoint of the contaminant which it is desired to remove from the gas. Gases free from these easily condensable components will, for the most part, be identified herein as purified or pure gases, it being understood that these purified gases, as in the case of air, can be subjected to further rectification or disjunction of the components which are not easily condensable and, indeed, can be separated only with considerable effort. The purified gas may also be subjected to treatments other than rectification or may be used without further treatment as a combustion gas, a synthesis gas in the manufacture of higher compounds, or for any other purpose as required.

The removal of easily condensable components from gas mixtures, e.g. the separation of water and carbon dioxide from air or the recovery of easily condensable fractions enriched with substances such as ethylene from coke-oven gas, has generally been carried out heretofore with the use of alternating counterflow heat exchangers of various constructions whose functions are changed periodically within a treatment cycle. Such processes have also been used for the recovery of gas fractions rich in sulfur oxides (especially sulfur dioxide) from metal-roasting ovens in which the metal sulfides are included among the substances treated. The counterflow heat exchangers used for these purposes include regenerative heat exchangers operating with or without serpentine tubular passages for the gases, tube-type and plate-type countercurrent heat exchangers and the so-called "reversing exchangers." In all of these devices, with the exception of the regenerative heat exchangers, a warm crude gas continuously transfers part of its sensible heat and intrinsic content to a cold purified gas via the thermally conductive heat-exchanger walls so that the cooled components, when their dewpoint is attained, separate from the crude gas as liquids or solids and remain in the heat exchanger while a cooled, more-or-less purified gas passes therefrom. During a reversal of the functions of the heat-exchanger chambers, sections or pairs of heat exchangers, the precipitated contaminants are removed from the heat exchanger.

Regenerative heat exchangers do not generally effect a direct transfer of heat from the warm crude gas to the cold purified gas but, instead, operate with the aid of a heat-storage mass or packing through which the crude gas initially flows in a tortuous manner; the heat-storage mass absorbs the available sensible and intrinsic heat of the crude gas and is itself warmed while cooling the gas so that easily condensable components are deposited on the heat-storage mass and give up heat of condensation thereto. In a subsequent operation of the heat exchanger, cold purified gas is admitted thereto in counterflow to the crude gas and again brings the heat-storage mass to its lower temperature while absorbing heat therefrom. During this process or prior thereto, contaminants can be swept from the chamber as will be more readily apparent hereinafter.

Several processes have been proposed heretofore for the removal of readily condensable components from gas mixtures with the aid of heat exchangers of the character described. For rectification of air, i.e. the production of oxygen and nitrogen—with or without the recovery of inert gases—from atmospheric air, easily condensable components are initially removed in an installation having, for example, four regenerators; two of these regenerators serve to cool the air and thus precipitate the condensable components therefrom while a second pair, previously serving to separate the undesirable components from the warm air, is cooled by nitrogen or oxygen produced in the rectification column, this cold pure gas being passed in counterflow (i.e. opposite the direction of crude-gas flow) through the second pair of heat exchangers. The cold purified gas sweeps the condensable contaminants deposited during the previous half cycle out of the regenerator. The second process is carried out in the separate pairs of regenerators simultaneously and the functions of the second pair are periodically interchanged with the cold gas passing through a regenerator in the direction opposite to that with which the previous warm gas streamed therethrough. From the installation just described, cool air, freed from easily condensable contaminants, can be led into the rectification tower in the usual manner.

In a process for the recovery of easily condensable fractions containing a large proportion of ethylene and referred to hereinafter as "crude ethylene-enriched" gases, a coke-oven gas or the like containing ethylene is treated to remove the easily condensable components, but is not then subjected to further rectification. Instead, the gas free from ethylene and other condensable constituents must be heated again for its conventional use. For this purpose, three regenerative heat exchangers or heat-exchanger sections have been required; in a first heat exchanger or section, the crude gas is cooled and carbon dioxide, water vapor and ethylene condensed; in a second chamber in which the condensation has been completed, the condensed components (especially carbon dioxide and ethylene) are vaporized under vacuum and/or with the aid of a scavenging or flushing gas and are conducted to a gasometer; in the third regenerator, from which the contaminants have previously been flushed as described, the cold carbon dioxide- and ethylene-free gas is again heated for further use.

All of these processes, which can be carried out in a corresponding manner, also in tube and plate counterflow heat exchangers, have the disadvantage that the crude gas and a purified gas in timed sequence follow one another through the same heat-exchanger sections; in the case of air rectification, the purified gas can be one of the components of air disjunction or fractionation (i.e. oxygen or nitrogen) and serves as a scavenging and flushing gas so that it is again contaminated with the components from which the air has been freed. A similar contamination is observed in the other processes described above. Even in methods leading to the recovery of ethylene-enriched gases, in which a scavenging period is interposed between the crude-gas decontamination and the purified-gas reheating stages, the vaporization of the contaminants during the flushing period is never so complete as to insure that the purified gas will be totally or substantially free from contaminants during the following reheating period; this is particularly disadvantageous since the coke-oven gas, when treated as indicated above to remove ethylene, also gives up hydrogen sulfide. The warmed purified gas is most desirable when it is free from all traces of hydrogen sulfide so that recontamination of the gas with this impurity during the final heating step is particularly inconvenient.

A pure gas, free from recontamination by previously precipitated easily condensable components, could only be recovered heretofore when one or more sections of the periodically switched or functionally reversed heat exchangers is reserved for the purified gas. In the rectification of purified air, it is generally desired that the oxygen produced by the disjunction or fractionation of the gas be entirely free from recontamination and at the highest purity possible. For this purpose, it has been proposed to provide regenerative heat exchangers having heat-storage masses as previously described and, in addition, serpentine (e.g. helically coiled) tubes or passages through which only the oxygen passes while air and nitrogen are interchangeably circulated through the main chambers or passages of the heat exchanger into contact with the heat-storage mass. When tube and plate counterflow heat exchangers are used for this purpose, the heat exchangers are frequently provided with three sections, one of which is reserved for oxygen while air and nitrogen are alternately passed through the other two sections of the heat exchangers.

Another method of obtaining cold purified gas, uncontaminated by the condensable components deposited in the regenerator, requires that the crude gas be cooled and freed from the easily condensable components during a first operating period, while the condensate is vaporized by a scavenging or flushing gas during a second period; during a third period a portion of the previously purified and cooled gases is passed through the flushed regenerator and is warmed thereby. The now-heated relatively pure gas is then passed through a tube-type heat exchanger in counterflow to a cold rectifier product, e.g. nitrogen or oxygen, the latter being removed from the installation as an uncontaminated gas and serving to cool that portion of the purified gas which had previously been led through the flushed regenerator to absorb heat therefrom. Such an arrangement is disclosed in German Patent No. 1,065,867.

All of these known processes for the removal of easily condensable components from gas mixtures, which yield purified gases free from recontamination, have in common the disadvantage that only a part of the crude gas can be recovered as uncontaminated purified gas since the remainder of the purified gas must be used to scavenge the precipitated contaminants from the heat-storage mass of the regenerators or the walls of the reversing heat exchanger.

In fact, the extent of the removal of the contaminants from the heat exchangers is directly related to the proportion of the purified gases used as the flushing and scavenging fluid. In dealing with the removal of easily condensable components from gas mixtures one can define the sublimation ratio $K_S$, which is a measure of the efficiency in eliminating the contaminants from the heat exchanger, as the ratio between the algebraic product of the crude-gas pressure $P_C$ in the heat exchanger and the scavenging-gas volume or flow rate $M_S$, and the algebraic product of the scavenging-gas pressure $P_S$ in the heat exchanger and the crude-gas volume or flow rate $$M_C \text{ or } K_S = \frac{P_C \times M_S}{P_S \times M_C}$$

From the foregoing relationship, it will be seen that as $K_S$ increases the sublimation of the precipitated component increases; an increased $K_S$ signifies that a larger crude-gas pressure and scavenging-gas volume can be employed with a smaller scavenging-gas pressure and crude-gas volume. The selection of the sublimation ratio $K_S$ depends largely upon the construction of the heat exchanger; with conventional regenerative heat exchangers filled with heat-storage masses which hardly interfere with the sublimation process, it is sufficient to select the $K_S$ equal to unity, thereby obtaining an effective vaporization of the precipitated contaminants. The crude-gas pressure $P_C$ is determined on technological grounds by the requirements of the air-rectification installation to be about 5 to 6 atmospheres, so that $K_S$ is correspondingly large. When the total volume of the cold purified gas is passed through the regenerator, a contamination of the purified gas by the easily condensable components precipitated on the heat-storage mass is unavoidable as discussed above. In the use of serpentine tubes in the regenerators for the return of purified gas for heat exchange and sublimation without contamination of the purified gas, it is observed that a reduction of the heat-exchange ratio and the sublimation ratio $K_S$ occurs. It has been found empirically that $K_S$ for a regenerator with serpentine tubing for the prevention of contamination of pure gas should be approximately 2.5 when a satisfactory removal of the condensate is desirable. When $P_C$ is about 5.8, atmospheres as determined by the technological requirements of the rectification installation, and $P_S$ is at the convenient pressure of 1.1 atmospheres, the scavenging-gas volume or flow rate must be half as large as the crude-gas volume or flow rate $M_C$. It is evident, therefore, that a process of this type can yield a purified gas volume which is at most half that of the crude-gas volume. In this case, the use of serpentine tubing in regenerative heat exchangers serves to increase the apparatus cost without affording a significant increase in the ratio of recovered purified gas to crude gas. Similar relationships exist in the cooling and purifying of gases in reversing heat exchangers; the sublimation ratio $K_S$ in reversing plate or tube heat exchangers is about 2.5 so that the identical pressure ratio of crude gas to scavenging gas as given above requires that the crude-gas volume be twice the recovered purified-gas volume. The same holds true for the system described in German Patent No. 1,065,867 mentioned above. In the device of this patent, however, much larger heating surfaces must be provided for the transfer of thermal energy.

With the conventional processes it is therefore not possible even in a Linde-Frankl installation to recover more than 50% of the volume of the crude gas (i.e. air) as pure gases free from the condensable components. It is, therefore, the principal object of the present invention to provide an improved process for the removal of easily condensable components from gas mixtures.

A more specific object of this invention is to provide a system for the removal of water vapor and carbon dioxide from air to be subjected to rectification to its components (i.e. oxygen and nitrogen) whereby a greater economy of processing and capital costs can be realized.

Still another object of this invention is to provide an improved installation for the recovery of gases free from easily condensable components as well as gases enriched in such components.

These objects and others which will become more readily apparent hereinafter are attained, in accordance with the present invention, by a process making use of periodically reversible heat exchangers wherein heat exchangers are provided which are subjected to a vacuum vaporization of the easily condensable components between successive treatments of a gas from which the condensable component is deposited. The present invention thus involves the precipitation as a liquid or a solid of the easily condensable components of a gas stream by passing it in counter-flow to a cold pure gas, the deposited contaminants being vaporized under reduced pressure subsequent to the passage of the crude gas through the heat exchanger, the heat-absorbing purified gas passing through a reserved section of the heat exchanger and thus being free from contamination by the condensed substances in another portion of this heat exchanger. More specifically, the invention resides in the vaporization of the condensate at a subatmospheric pressure of 0.05–0.5 atmosphere and preferably about 0.1 atmosphere.

The vaporization of the precipitated easily condensable components under reduced pressure can be carried out, according to a further feature of the present invention, with the passage of a scavenging-gas quantity $M_S$, flowing through the section of the heat exchanger containing the condensable components, of approximately $$\frac{P_s M_c}{P_c} \text{ to } 3 \frac{P_s M_c}{P_c}$$

and preferably about $$1.5 \frac{P_s M_c}{P_c}$$

The scavenging gas can be either the cooled condensate-free gas or a product of the rectification apparatus (i.e., oxygen or nitrogen) or even some other gas. The scavenging gas quantity $M_S$ is, under these conditions, between 0.01 to 0.25 times the crude-gas quantity $M_c$ when the crude-gas pressure is 5.8 atmospheres as is preferred for the air-rectification installation. Thus, under the worst conditions, three-quarters of the crude gas is converted to purified gas free from recontamination; by comparison, conventional systems are only able to recover a maximum of 50% of the crude gas as purified gas.

The process, according to the present invention, can be carried out in different types of heat exchangers and with different cycles and timing relationships. When, according to one feature of the present invention, plate heat exchangers are employed, one section of the heat-exchanger installation is used for condensation of the condensable component from the crude gas, while another section is used for the vacuum sublimation of previously deposited contaminants and a third section undergoes a pure-gas heat exchange, only the crude-gas treatment and sublimation sections being interchanged in function while the purified gas continuously passes through the third section. The heat-transfer efficiency is in this case only about 75% because the heat exchange between the crude gas and the purified gas is limited on one side by the vacuum section. Aside from this, sublimation on one of the sides of the vacuum section is also rendered more difficult by the presence of an adjacent section of the heat exchanger through which the cold purified gas is passed, the low temperature of this latter gas inhibiting sublimation and vaporization even at reduced pressures. While the arrangement had advantages in that condensation and vaporization in adjacent compartments and sections eliminate the need for storage of the heat of condensation given up in the former section, the heat surface being thus minimal, the disadvantage arising from the difficulties in vaporizing the condensate in the region of the cold section of the heat exchanger must be considered.

According to another aspect to this invention, the process is carried out in two blocks or groups of plate heat exchangers; one of the sections of a first group serves to treat the crude gas while the other section of this group conducts the cold purified gas therethrough while, of the sections of the second group, one undergoes vacuum removal of previously deposited easily condensable substances, which removal is aided by a scavenging gas if necessary, and then is cut off while the other undergoes deposition and precipitation from the crude gas.

For the switch-over, the crude-gas section of the first pair is coupled with the sublimation section of the second pair while the pure-gas section of the first pair is associated with the shut-off sections of the two pairs being interchanged in function. The heat-transfer surfaces of an installation of this type are about one-third greater than those of the installation described in the previous paragraphs, while the heat-transfer efficiency approximates 100% since a third heat-exchange section does not interfere with the crude-gas and purified-gas sections. Moreover, the sublimation process is not impeded by the presence in a neighboring section of the cold purified gas. Since, in this arrangement, the heat of condensation must be stored in the heat exchangers, the heat capacity of the plates of the heat exchanger must be sufficient to permit this storage and the material from which the plates are constructed selected accordingly.

According to a further feature of this invention, the sublimation step is facilitated by increasing the temperature of the sublimation section of the system; to this end, the present invention provides that, the switch-over of the crude-gas and sublimation sections and the switch-over of the pure-gas section to the shut-off section be offset in time, so that, after the deposition of condensate in the crude-gas section of the first pair, the pure-gas section of the first pair and the shut-off section of the second pair are reversed in function and—after a partial warming of the condensate-containing section of the first pair it and the sublimation section of the second pair are functionally reversed.

Still another aspect of the present invention involves the use of tube-type heat exchangers with the pressure and flow-rate proportions given above. Thus the instant invention provides that a reversible cooler can be employed, wherein a serpentine or helical tube can be surrounded by a housing, the chamber around the serpentine tube or tubes being used alternately for precipitation of the readily condensable components from the crude gas and the vacuum sublimation or vaporization while the tube conducts the pure gas during the precipitation period. Moreover, it is also contemplated—in accordance with the invention—to provide two serpentine-tube systems within the chamber for alternately carrying the crude gas during precipitation and effecting vacuum vaporization of the contaminants, while the outer chamber is used exclusively for the pure gas. This system, which requires fewer heating surfaces, is characterized, however, by a reduction in the heat-transfer efficiency although it is especially advantageous when the pure gas is at a reduced pressure.

Preferably, the process according to the invention is carried out with two heat exchangers of the serpentine-tube type described above, the heat capacities of these heat exchangers being sufficient to store the heat of condensation given up upon precipitation of the easily condensable components. In this case, the tube system of the first serpentine-tube heat exchanger serves to conduct the crude gas and thus to precipitate the condensable components, while the outer chamber conducts the cold pure gas; concurrently, the outer chamber of the second serpentine-tube heat exchanger is cut-off while the vacuum-vaporization process is carried out in the tube system thereof, the two exchangers being functionally interchanged.

The heat-storage capacity can, in accordance with the present invention, be increased when the outer chambers of both serpentine-tube heat exchangers are filled with a heat-storage mass, e.g. granulated aluminum. The requirement of a large heating surface is thus fulfilled while the heat transfer from the warm crude gas to the cold pure gas is not impeded by the vacuum section, thereby permitting heat-transfer efficiencies proximal to 100%. By comparison to other systems having large cold-gas and small warm-gas sections, the pressure drop of the cold pure gas and, after reversal, of the warm crude gas is substantially reduced in the present arrangement.

The sublimation of the condensed components can be augmented in this latter arrangement also by offsetting the switch-over to the crude-gas and sublimation sections of the installation and the pure-gas and cut-off sections, whereby—after the condensation of the components with relatively high boiling points from the crude gas—the pure-gas section of the first heat exchanger is initially interchanged with the cut-off section of the second exchanger and, after an interval, the crude-gas section of the first heat exchanger is interchanged with the sublimation section of the second to effect a partial warming of section to be subjected subsequently to vacuum vaporization.

When two or more gas streams, or fractions of gas streams, are to be recovered in an uncontaminated state, the present invention provides that the two functionally interchangeable heat exchangers each be formed with a corresponding number (i.e. two or more) serpentine-tube systems surrounded by a common chamber; in these outer chambers of the heat exchangers, the crude-gas deposition of easily condensed components is alternated with a vacuum volatilization of these components while the uncontaminated gases are passed through the respective tube systems of said heat exchanger, the outer chamber of which is flowed through by crude gas. In these cases as well, the heat capacity of the tube systems must be sufficient to permit storage of the heat on condensation. Again, an offset in the interchange times will facilitate the vacuum sublimation or vaporization. In all of these arrangements, the heat capacity of the chambers can be increased by the use of heat-storage masses, such as the granular aluminum mentioned above. It is also contemplated, according to the present invention, to divert a predetermined fraction of the warmed pure-gas stream, by means of a blower or the like, through the cut-off section. This fraction can then be mixed with the cool pure gas and led together therewith through the pure-gas section of the installation. The heat capacity of the circulated fraction of the pure gas must be such that the heat given up by the high-boiling components in the crude-gas section can be transferred to the sublimation section.

Figure 2:
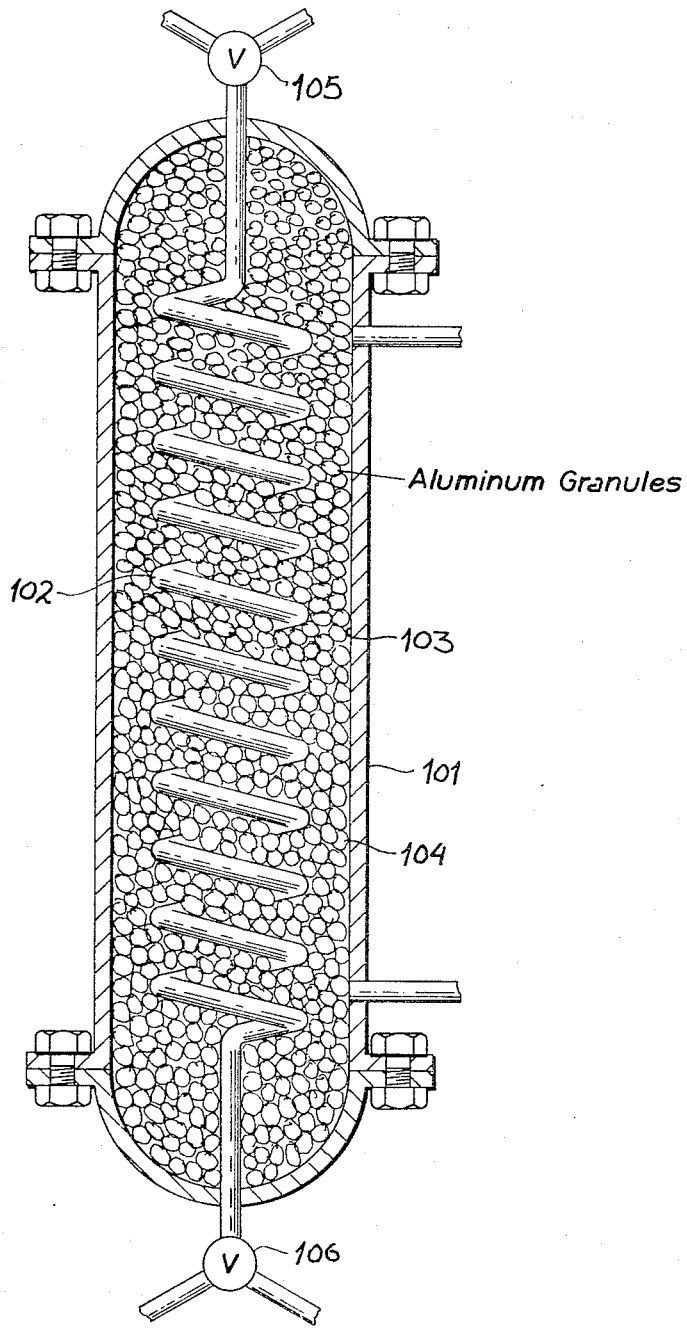

The above and other objects, features and advantages of the present invention will become more readily apparent from the following description and specific examples, reference being made to the accompanying drawing, in which:

FIG. 1 is a schematic flow diagram of an installation embodying the present invention; and FIG. 2 is a vertical cross-sectional view through a heat-exchanger suitable for incorporation in such an installation.

In FIG. 1 of the drawing there is shown a main inlet line 1 for a gas mixture from which the condensable components are to be removed, this mixture being air when the outflow from the installation is to feed a rectification apparatus as diagrammatically shown at 100. From the main line 1, the air can be led via line 2 and a flow-rate control valve 2′ into a regenerative heat exchanger 3. Valve 2′ and a further valve 20′ along the line 1 determine the proportion of the warm crude gas or air passed into the regenerator 3. From this regenerator, cold decontaminated air is conducted along a line 3′ via a check valve 3″ to the purified-gas outlet conduit 4 leading to the rectification apparatus 100 wherein the air is fractionated to yield nitrogen and oxygen as well as minor quantities of other gases. The regenerative heat exchanger 3 alternates in function with the other heat exchanger 7 of the pair; this exchanger receives air from the main line 1 via conduit 7′ and the valve 7″. When the warm gases pass through this latter regenerator, they are conducted, upon purification, through the duct 7a and the check valve 7b into line 4. Regenerators 3 and 7, however, are paired so as to operate alternately with the crude gas and the purified gas. A line 6 conducts the relatively purified and cold gas from the rectification apparatus 100 through a check valve 7c and a control valve 6′ into the regenerator 7 wherein it is warmed and flushes previously deposited contaminants out through an outlet 8 via another valve 7d. When the heat exchangers 3 and 7 have their functions interchanged, the cold gas flows through the control valve 3a past check valve 3b into exchanger 3.

The remainder of the warm crude-gas or air stream is conducted by way of valve 20′ through a water absorber 20 and then through the serpentine-tube system 10 of a heat exchanger 9, the decontaminated product passing via duct 9′ through a check valve 9″ into the line 4 supplying the rectification apparatus. Heat exchanger 9 is paired with another heat exchanger 13 which upon function interchange, can be supplied with this fraction of air via the valve 21′ and is connected in series with the water absorber 21 while discharging the cold and decontaminated gas via duct 13′ and check valve 13″ into the outlet tube 4. A portion of the cold-gas stream (e.g. impure nitrogen) produced by the rectification device 100 is led from the latter via line 5 but is diverted as a scavenging gas from the main flow 6 via line 17 into the heat exchangers 9 and 13 via the check valves 18, 18′, a valve 17′ determining the proportion of the gas so diverted.

A conduit 11 carries pure cold oxygen, contamination of which is undesirable, from the rectification apparatus 100 and feeds it, under the control of valves 11′, 11″ to the main chambers 12a and 12b of the serpentine-tube heat exchangers 9 and 13. These heat exchangers feed into change-over valves 19″ and 19 connected to the outlet pipe 14 while a suction pump 16 can be coupled with the tube systems of the heat exchangers via valves 16′, 16″. Some of the warmed oxygen leaving the main chambers of the operating heat exchanger 9 or 13 can be recirculated via line 25 and a blower 26 to the cut-off chamber of the other heat exchanger in which the vacuum sublimation is facilitated. The oxygen, again cooled, can be recombined (line 27) with the cold-gas stream.

*Example*

In a Linde-Fränkl installation 100, 5000 m.³/h. (standard temperature and pressure—S.T.P.) of pure oxygen is to be recovered uncontaminated by the condensable impurities present in the atmospheric air which is to be fractionated to yield this quantity of oxygen. According to the present invention, an air flow rate of about 30,000 m.³/h. (S.T.P.) is required, this volume being maintained at a pressure of about 5.8 atmospheres as required by the rectification device. The apparatus of FIG. 1 is used to remove the condensable impurities and the system illustrated in heavy lines shows the fluid flow during one period of operation while the light lines show the flow paths during a second operating period of the cycle. In the operating phase illustrated, the regenerator 3 is used to treat the warm air to condense the impurities therefrom and 25,000 m.³/h. (S.T.P.) of the air from line 1 is led through this heat exchanger. The latter is filled with a heat-storage mass (e.g. granular aluminum) which absorbs heat from the air and effects a condensation of the impurities such as $CO_2$ and $H_2O$, while cooling the air which flows as a decontaminated gas through duct 4 to the rectification installation 100. The products of this installation include approximately 25,000 m.³/h. (S.T.P.), of cold impure nitrogen most of which is led through the lines 5 and 6 and the regenerator 7 containing condensate from a previous period. This condensate of carbon dioxide and water is scavenged from the regenerator 7 and led off via duct 8.

The heat-absorbing capacity of the 5000 m.³/h. (S.T.P.) of oxygen produced in the rectification installation 100 is used as follows: the amount of warm contaminated air having a corresponding sensible and intrinsic heat adapted to be given up upon condensation of the high boiling components, i.e. about 5000 m.³/h. (S.T.P.), is led through an adsorber 20 wherein the moisture content of this fraction of the air is substantially reduced. In the adsorber, the dewpoint of the water vapor in the air is reduced to about 0° C. From the adsorber, the air passes through the tube system 10 of heat exchanger 9 where it is cooled by a counterflow of the cold oxygen (from line 11) passing through the outer chamber 12a of the heat exchanger. Easily condensable impurities, namely the remainder of the water vapor and carbon dioxide carried by the gas stream, is deposited in the tube system 10 as a condensate while the purified air is fed into line 4 through which it is conducted to the rectification apparatus 100 together with the major part of the air from regenerator 3. Simultaneously, the condensate deposited in the tube system 15 of the other heat exchanger 13 during the previous operating period is vaporized by suction at a subatmospheric pressure of 0.1 atmosphere via the exhaust pump 16. To facilitate flushing of the tube system 15, about 130 m.³/h. S.T.P. of nitrogen is drawn from line 5 over duct 17. The chamber 12b surrounding the tube system 15 is cut off by a corresponding valve 19. During the sublimation carried out in tube system 15, the adsorber 21 is freed from moisture.

The sublimation step is facilitated when the switchover of the air-treating and sublimation sections 10 and 15 is offset from the switchover of the oxygen and cut-off sections 12a and 12b. In this case, air and oxygen are in heat-exchanging relationship in the heat-exchanger 9 when the oxygen stream through regenerator 13 is terminated. The termination of the flow of cold oxygen to heat exchanger 9 and its shifting to heat exchanger 13 in advance of the commencement of the scavenging period results in a warming of the tube system 10 by about 20° C. so that sublimation is facilitated and a small sublimation ratio $K_S$ can be selected. It is only subsequent to the reversal of the cold oxygen flow that the function of the tube systems 10 and 15 are interchanged.

The operation of the heat exchangers 9 and 13 was carried out with a $K_S=1.5$ as calculated from the following data: $P_C=5.8$ atmospheres, $P_S=0.1$ atmosphere, $M_C=5000$ m.³/h. S.T.P., and $M_S=130$ m.³/h. S.T.P.

By means of the periodic switching of the pure gas and the heating of the condensate in advance of the application of suction, it is possible economically to reduce $K_S$ to a value less than or only slightly greater than one. Moreover, it is also possible to use a crude-gas and recoverable-pure-gas ratio of about 1:1. In this case, heat exchangers 3 and 7 can be disregarded. If it is desired to recover nitrogen as well as oxygen in the form of an uncontaminated gas, the regenerators 3 and 7 are provided with serpentine-tube systems as in the case of heat exchangers 9 and 13 with the nitrogen passing through the heat exchanger as oxygen does in the system described.

The present system can also be used for the treatment of gases other than air (e.g. coke-oven gases and converter gases) which can be freed from carbon dioxide and similar relatively high boiling components. When the converter gas is treated, it is preferable that it be prepurified so that its carbon-dioxide content is not more than about 0.5%.

Another important application of the present invention is in the separation of nitrogen from hydrogen at temperatures below the melting point of the nitrogen. In this temperature range, the pressure effects described in the literature come into play. Thus, in the separation of nitrogen from oxygen it is observed that the partial pressure of nitrogen over solid nitrogen is greater in compressed hydrogen than in expanded hydrogen, in other words, hydrogen in its expanded state can take up less nitrogen than compressed hydrogen at the same temperature. When the present invention is applied to this separation of gases, therefore, the sublimation of solid nitrogen separated from compressed hydrogen is only possible if the sublimation is carried out at an elevated temperature and the pure gas is switched to another heat exchanger shortly before the end of the crude-gas treatment steps in which the nitrogen is deposited. Thus the sublimation mass is heated prior to the application of reduced pressure.

In FIG. 2, I show a heat exchanger which can be substituted for those shown at 3 and 7 in FIG. 1 and is of the type illustrated at 9 and 13. The heat exchanger comprises a cylindrical shell 101 surrounding a helically coiled serpentine tube 102 and defining therewith a chamber 103 filled with aluminum granules 104. The tube 102 is provided with a pair of valves 105, 106 adapted to permit the interchange of functions of this tube between vacuum sublimation and warm-gas condensation.

The invention described and illustrated is believed to admit of many modifications within the ability of persons skilled in the art, all such modifications being considered within the spirit and scope of the appended claims.

What is claimed is:

1. A method of operating an installation for the removal of easily condensable components from a warm gas mixture, said installation including at least two functionally interchangeable heat exchangers which are interchanged after a predetermined period, said method comprising the steps of:

(a) cooling said warm gas mixture in a first section of one of said heat exchangers by passing it in a stream therethrough while passing a cold gas stream through a second section of said one of said heat exchangers during at least the major part of said period, thereby condensing said components in said first section, said cold gas streams having a heat capacity approximately equal to that of the warm-gas stream;

(b) substantially simultaneously subjecting a first section of the other of said heat exchangers, in which easily condensable components of a previous warm gas mixture were deposited by the cooling thereof, to a reduced pressure of substantially 0.05 to 0.5 atmosphere absolute to volatilize the condensed components in said first section of said other heat exchanger, and scavenging the volatilized condensed components during the application of said reduced pressure, the scavenging gas employed for flushing said first section having a flow rate $M_S$ equal substantially to between $$\frac{P_S M_C}{P_C} \text{ and } \frac{3 P_S M_C}{P_C}$$

where $P_C$ is the pressure in atmosphere absolute of the warm gas mixture passed through said first sections, $P_S$ is the scavenging gas pressure in atmospheres absolute, $M_C$ is the flow rate in cubic meters per hour of the warm gas mixture, and $M_S$ is the flow rate in cubic meters per hour of the scavenging gas; and (c) upon substantially complete elimination of the easily condensable components from the first section of said other heat exchanger and upon deposition of easily condensable components in the first section of said one heat exchanger, functionally interchanging said heat exchangers to conduct a warm gas mixture through the first section of said other heat exchanger in heat-exchanging relationship to a cold gas passed through the second section thereof, while subjecting said first section of said one heat exchanger to a reduced pressure as in step (b).

2. The method defined in claim 1, further comprising the step of removing water vapor from said warm gas mixture prior to passing it through a first section of one of said heat exchangers.

3. The method defined in claim 1 wherein the second section of each of said heat exchangers is cut off from the flow of gas therethrough during at least the major part of the period during which the respective first section is subjected to reduced pressure in step (b).

4. The method defined in claim 1 wherein the flow of said cold gas through the second section of each heat exchanger during the respective step (a) to cool the warm gas mixture is terminated in advance of switchover of the warm gas mixture from one of the first sections to the other and is simultaneously switched to the second section of each heat exchanger during the respective step (b).

5. The method defined in claim 4 wherein said reduced pressure is of the order of 0.1 atmosphere absolute and the volume $M_S$ is equal to approximately $$\frac{1.5 P_S M_C}{P_C}$$

6. A method of operating an installation for the removal of easily condensable components from a warm gas mixture, said installation including at least two functionally interchangeable heat exchangers, said method comprising the steps of:
  (a) cooling said warm gas mixture in a first section of one of said heat exchangers by passing therethrough while passing a cold gas through a second section of said one of said heat exchangers, thereby condensing said components in said first section;
  (b) substantially simultaneously subjecting a first section of the other of said heat exchangers, in which easily condensable components of a previous warm gas mixture were deposited by the cooling thereof, to a reduced pressure of substantially 0.05 to 0.5 atmosphere absolute to volatilize the condensed components in said first section of said other heat exchanger; and
  (c) upon substantially complete elimination of the easily condensable components from the first section of said other heat exchanger and upon deposition of easily condensable components in the first section of said one heat exchanger, functionally interchanging said heat exchangers to conduct a warm gas mixture through the first section of said other heat exchanger in heat-exchanging relationship to a cold gas passed through the second section thereof, while subjecting said first section of said one heat exchanger to a reduced pressure as in step (b), a portion of the cold gas emerging from one of the second sections during step (a) in a warmed condition is drawn through the second section of the heat exchanger whose first section sustains a reduced pressure to volatilize the condensed components and heats the respective first section to facilitate volatilization therein while being cooled, the cooled portion being then added to the cold gas entering said one of said second sections.

7. The method defined in claim 6 wherein said heat exchangers each include a serpentine-tube system constituting the respective first section and a respective chamber surrounding each system and constituting the respective second section, said cold gas being passed through said second sections only of said heat exchangers and being removed therefrom uncontaminated by said components.

8. The method defined in claim 6 wherein said second sections are filled with a heat-storage mass whose heat capacity is selected to be at least sufficient to store the heat of condensation of the easily condensable components.

9. An installation for the removal of easily condensable components from a warm-gas mixture comprising heat-exchanger means provided with at least three sections, including a first section, a second section and a third section; first conduit means for admitting a warm gas mixture to said first section, thereby cooling said warm gas mixture and condensing said components therefrom; second conduit means for passing a cold gas through said second section in heat-exchanging relationship with said mixture in said first section for cooling said mixture; suction means connectable to said third section for subjecting it to reduced pressure to volatilize previously condensed components therefrom; and switch-over means for at least said first and third sections whereby said first conduit means is connectable to said third section and said suction means is connectable to said first section, said heat-exchanger means including a pair of heat exchangers, each having serpentine-tube means forming one section and a chamber surrounding said serpentine-tube means and in heat-exchanging relationship therewith while forming another section, said heat exchangers being functionally interchangeable whereby said first section constitutes said one section of one of said heat exchangers while said second section constitutes said other section thereof and said third section constitutes said one section of the other heat exchanger, said other sections of said heat exchangers being filled with granular aluminum constituting a heat-storage mass, said one section of said heat exchangers being connected in series with respective adsorbers for at least partial removal of water vapor from the warm gas mixture.

References Cited

UNITED STATES PATENTS

| 2,089,558 | 8/1937  | Karwat      | 62—12   |
| 2,586,811 | 2/1952  | Carbo       | 62—13   |
| 2,663,167 | 12/1953 | Collins     | 62—13   |
| 2,881,595 | 4/1959  | Fetterman   | 62—18 X |
| 2,968,160 | 1/1961  | Schilling   | 62—14   |
| 3,059,439 | 10/1962 | First et al.| 62—13   |
| 3,063,247 | 11/1962 | Yendall     | 62—13   |
| 3,073,128 | 1/1963  | Becker.     |         |
| 3,074,245 | 1/1963  | Becker      | 62—13 X |
| 3,075,362 | 1/1963  | Becker      | 62—13   |
| 3,091,093 | 5/1963  | Becker      | 62—12   |

WILBUR L. BASCOMB, Jr., *Primary Examiner.*

NORMAN YUDKOFF, *Examiner.*

W. PRETKA, *Assistant Examiner.*